US009871972B2

(12) United States Patent
Chen et al.

(10) Patent No.: US 9,871,972 B2
(45) Date of Patent: Jan. 16, 2018

(54) AUTO EXPOSURE CONTROL SYSTEM AND METHOD

(71) Applicants: Himax Imaging Limited, Tainan (TW); Himax Technologies Limited, Tainan (TW)

(72) Inventors: Po-Chang Chen, Tainan (TW); Po-Fang Chen, Tainan (TW); Wei-Chieh Yang, Tainan (TW)

(73) Assignees: Himax Imaging Limited, Tainan (TW); Himax Technologies Limited, Tainan (TW)

( * ) Notice: Subject to any disclaimer, the term of this patent is extended or adjusted under 35 U.S.C. 154(b) by 23 days.

(21) Appl. No.: 15/188,613

(22) Filed: Jun. 21, 2016

(65) Prior Publication Data

US 2017/0366725 A1 Dec. 21, 2017

(51) Int. Cl.
H04N 5/235 (2006.01)
H04N 5/243 (2006.01)

(52) U.S. Cl.
CPC ......... H04N 5/2352 (2013.01); H04N 5/2353 (2013.01); H04N 5/243 (2013.01)

(58) Field of Classification Search
CPC .... H04N 5/2352; H04N 5/235; H04N 5/2353; H04N 5/2355; H04N 5/2351; H04N 5/238; H04N 5/243; H04N 5/353; G03B 7/08
See application file for complete search history.

(56) References Cited

U.S. PATENT DOCUMENTS 7,421,120 B2 * 9/2008 Kang ................. G06T 5/40
358/1.9
7,535,511 B2 * 5/2009 Wu ................. H04N 5/2351
348/222.1
7,668,452 B2 * 2/2010 Park ................. G03B 7/093
348/221.1
8,194,153 B2 * 6/2012 Asoma ................. H04N 5/235
348/221.1

(Continued)

FOREIGN PATENT DOCUMENTS

CN 102025909 A 4/2011
CN 103841324 A 6/2014
CN 104320593 A 1/2015

OTHER PUBLICATIONS

Office Action dated Jan. 10, 2017 in corresponding Taiwan Patent Application No. 105119651.

Primary Examiner — Michael Osinski
(74) Attorney, Agent, or Firm — Donald E. Stout; Stout, Uxa & Buyan, LLP

(57) ABSTRACT

An auto exposure control system includes a mean statistics unit that generates a weighted mean brightness value for an image array; a target control unit that determines a target brightness value according to an ambient status that is determined in accordance with an ambient light value, wherein, in one embodiment, the weighted mean brightness value is used as the ambient light value; a stabilization unit that generates stabilization control signals for the target control unit according to the ambient light value and ambient status information provided by the target control unit; and an exposure value control unit that computes a desired exposure value by comparing the target brightness value with the weighted mean brightness value and determines an exposure command according to the desired exposure value.

19 Claims, 17 Drawing Sheets

(56) References Cited

U.S. PATENT DOCUMENTS

| | | | | |
|---|---|---|---|---|
| 8,436,914 B2* | 5/2013 | Proca | H04N 5/243 | 348/230.1 |
| 8,917,949 B2* | 12/2014 | Shirata | G06T 5/008 | 382/254 |
| 8,958,658 B1* | 2/2015 | Lim | G06T 5/40 | 348/234 |
| 8,982,238 B2* | 3/2015 | Liu | H04N 5/2356 | 348/222.1 |
| 9,113,085 B2* | 8/2015 | Inaba | H04N 5/2351 | |
| 9,137,450 B2* | 9/2015 | Osawa | H04N 5/2351 | |
| 9,241,105 B2* | 1/2016 | Yun | H04N 5/23293 | |
| 9,456,146 B2* | 9/2016 | Yamada | H04N 5/23219 | |
| 9,467,632 B1* | 10/2016 | Chen | H04N 5/2353 | |
| 9,591,235 B2* | 3/2017 | Li | H04N 5/243 | |
| 9,800,793 B2* | 10/2017 | Chang | G06K 9/4661 | |
| 2004/0212696 A1* | 10/2004 | Tsugita | H04N 5/3572 | 348/231.6 |
| 2005/0286099 A1* | 12/2005 | Kameyama | H04N 1/62 | 358/518 |
| 2008/0030604 A1* | 2/2008 | Ehara | H04N 5/2254 | 348/296 |
| 2008/0175579 A1* | 7/2008 | Kawakami | G03B 15/03 | 396/155 |
| 2010/0097493 A1* | 4/2010 | Asoma | H04N 5/235 | 348/229.1 |
| 2011/0050923 A1* | 3/2011 | Nomura | G03B 7/097 | 348/208.99 |
| 2011/0304746 A1* | 12/2011 | Iijima | G03B 7/097 | 348/229.1 |
| 2012/0201453 A1* | 8/2012 | Furuya | H04N 1/6027 | 382/167 |
| 2012/0288263 A1* | 11/2012 | Yoshida | G03B 7/08 | 396/61 |
| 2013/0162880 A1* | 6/2013 | Yun | H04N 5/23216 | 348/333.11 |
| 2013/0235232 A1* | 9/2013 | Yang | H04N 5/2353 | 348/229.1 |
| 2014/0009683 A1* | 1/2014 | Yoshida | H04N 9/73 | 348/655 |
| 2014/0063294 A1* | 3/2014 | Tatsuzawa | H04N 5/265 | 348/239 |
| 2014/0307117 A1* | 10/2014 | Feng | H04N 5/2355 | 348/218.1 |
| 2014/0362281 A1* | 12/2014 | Yamada | H04N 5/23219 | 348/362 |
| 2015/0015740 A1* | 1/2015 | Cho | H04N 5/2351 | 348/234 |
| 2016/0028965 A1* | 1/2016 | Horii | H04N 5/225 | 348/333.01 |
| 2016/0105595 A1* | 4/2016 | Huang | H04N 5/238 | 348/363 |
| 2016/0295107 A1* | 10/2016 | Kinoshita | H04N 5/23212 | |
| 2017/0013242 A1* | 1/2017 | Fujiwara | H04N 9/735 | |
| 2017/0318208 A1* | 11/2017 | Toyoda | H04N 5/2256 | |

\* cited by examiner

137

AUTO EXPOSURE CONTROL SYSTEM AND METHOD

BACKGROUND OF THE INVENTION

1. Field of the Invention

The present invention generally relates to an auto exposure control system and method, and more particularly to an auto exposure control system and method with dynamic target brightness control.

2. Description of Related Art

An auto exposure system is conventionally used to adjust output images of an image sensor to achieve a desired brightness level by applying a proper exposure command such as an integration time, an analog gain and a digital gain determined by the auto exposure system. The proper exposure command is determined according to a desired exposure value which is usually decided by comparing a mean brightness value with a predefined target brightness value, wherein the exposure value may be a product of an integration time and a gain.

For a conventional auto exposure system, the target brightness value is the same for different environments (for example, day and night; outdoor and indoor). Using a fixed target brightness value for all kinds of ambience would be a simple and low cost method. However, it is easy to cause local over-exposure in a high contrast scene.

A need has thus arisen to propose a novel auto exposure system for dynamically adjusting target brightness value in accordance with different conditions as needed.

SUMMARY OF THE INVENTION

In view of the foregoing, it is an object of the embodiment of the present invention to provide an auto exposure control system and method with dynamic target brightness control that is capable of smoothly changing target brightness values without brightness oscillation, undershooting and overshooting.

According to one embodiment, an auto exposure control system includes a mean statistics unit, a target control unit, a stabilization unit and an exposure value control unit. The mean statistics unit generates a weighted mean brightness value for an image array. The target control unit determines a target brightness value according to an ambient status that is determined in accordance with an ambient light value, wherein, in one embodiment, the weighted mean brightness value is used as the ambient light value. The stabilization unit generates stabilization control signals for the target control unit according to the ambient light value and ambient status information provided by the target control unit. The exposure value control unit computes a desired exposure value by comparing the target brightness value with the weighted mean brightness value and generates an exposure command according to the desired exposure value. In one embodiment, the stabilization unit comprises a counter which increments a count number whenever the ambient status information indicates that the ambient status is determined to be changed, wherein the ambient status delays changing until the count number exceeds a predetermined number.

DETAILED DESCRIPTION OF THE INVENTION

Figure 1:
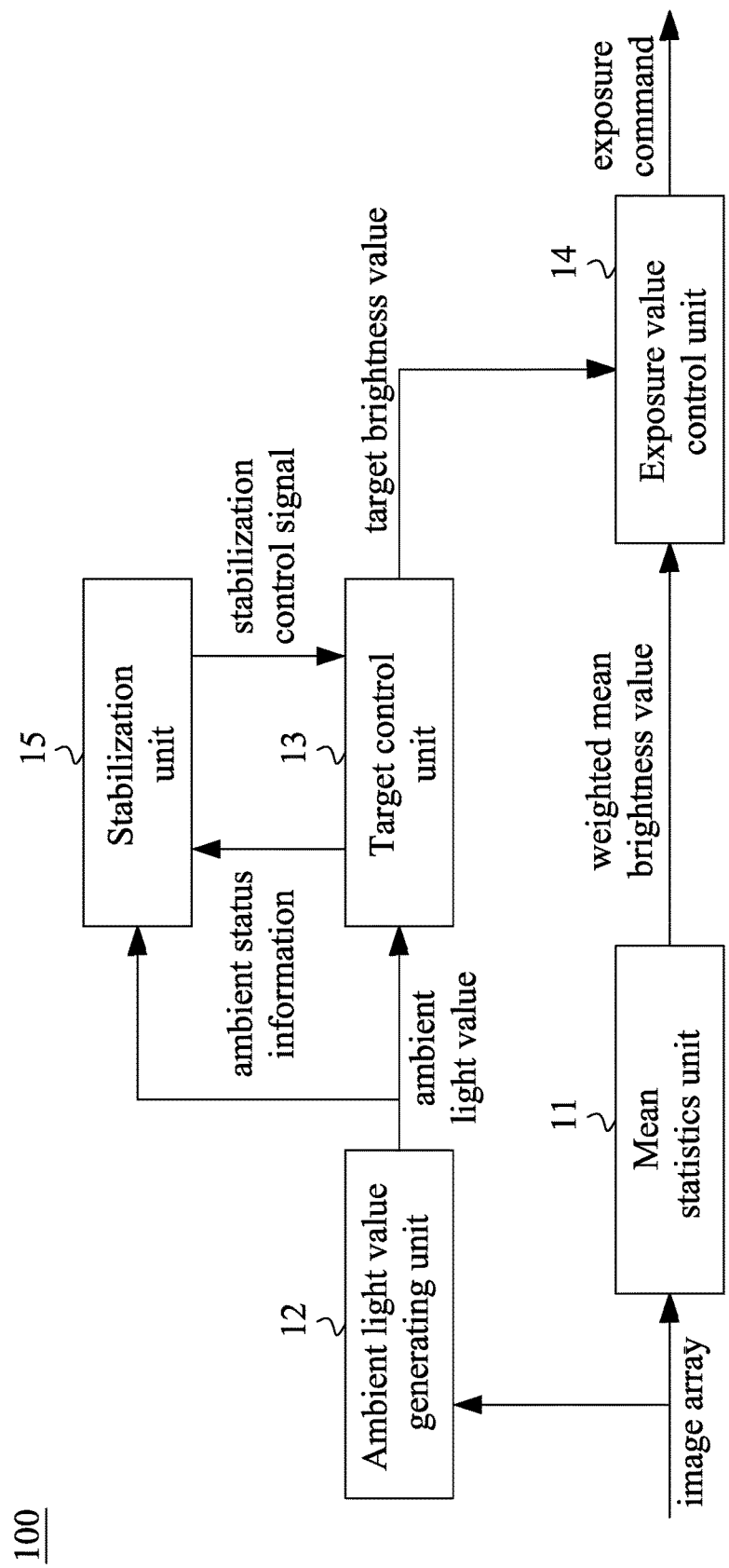
FIG. 1 shows a block diagram illustrated of an auto exposure control system adaptable for an image sensor according to one embodiment of the present invention.

FIG. 1 shows a block diagram illustrated of an auto exposure control system 100 adaptable for an image sensor according to one embodiment of the present invention. In the embodiment, the auto exposure control system 100 may input an image array comprised of a plurality of pixels, and may accordingly generate an exposure command which may include an integration time, an analog gain and a digital gain for the image sensor. The auto exposure control system 100 of the embodiment may be implemented by hardware, software, firmware or their combination. The auto exposure control system 100 of the embodiment may be performed by a processor such as a digital image processor.

In the embodiment, the auto exposure control system 100 may include a mean statistics unit 11 that is configured to generate a weighted mean brightness value for the image array. Specifically, the image array is divided into a plurality of regions, each of which having a specific weighting. The weighted mean brightness value may be generated by multiplying each pixel value by the weighting of the region in which the pixel is located, followed by dividing a sum of the weighted pixel values by a sum of the weightings of each pixel.

Figure 2:
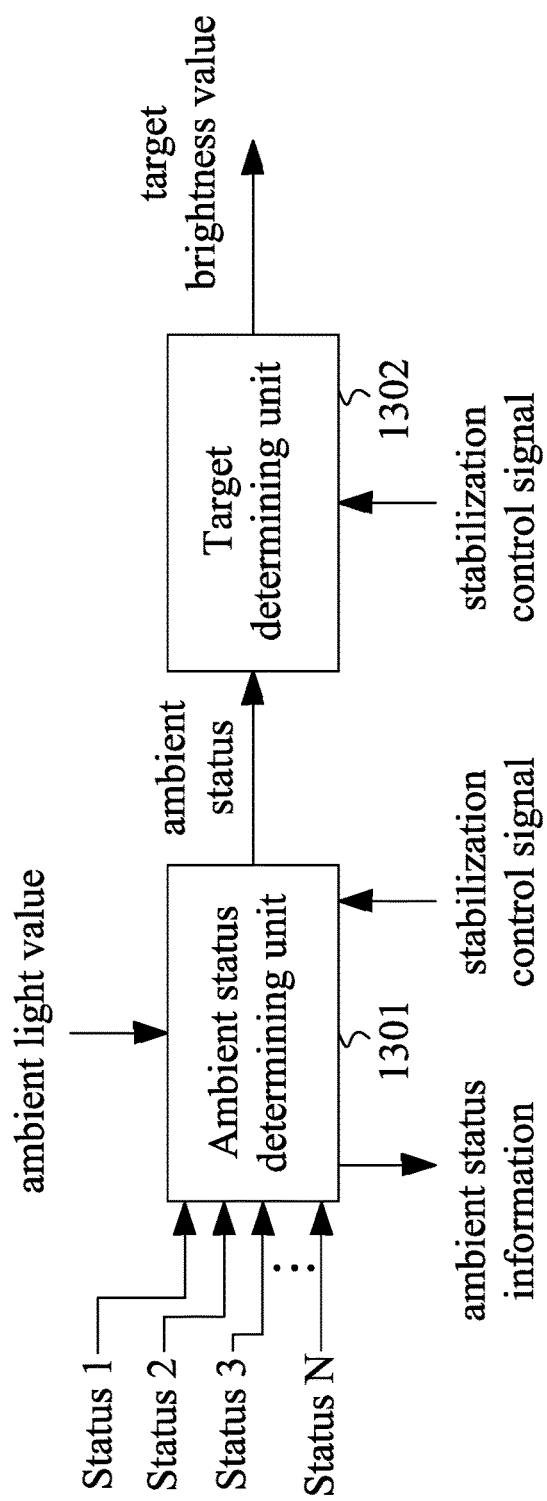
FIG. 2 shows a detailed block diagram illustrated of the target control unit of FIG. 1.

The auto exposure control system 100 of the embodiment may include a target control unit 13 that is configured to determine a target brightness value according to an ambient status that is determined in accordance with an ambient light value, wherein, in one embodiment, the weighted mean brightness value is used as the ambient light value. FIG. 2 shows a detailed block diagram illustrated of the target control unit 13 of FIG. 1. Specifically, the target control unit 13 may include an ambient status determining unit 1301 that is configured to determine the ambient status, for example, from status 1 to status N according to the ambient light value. The target control unit 13 may further include a target determining unit 1302 that is configured to determine the target brightness value according to the ambient status.

The auto exposure control system 100 of the embodiment may include a stabilization unit 15 that is configured to generate stabilization control signals for the target control unit 13 according to the ambient light value and ambient status information provided by the target control unit 13. Specifically, the ambient status information may contain a current ambient status, an expected new ambient status and threshold values related to the ambient statuses; the stabilization control signals may contain a status change control signal which verifies a change of the status and a sneak control signal which verifies a pre-change of the target brightness value. In one embodiment, when the target control unit 13 first determines a new ambient status, the ambient status information is sent to the stabilization unit 15. The stabilization unit 15 checks whether the change of the ambient status is appropriate and generates the stabilization control signals for the target control unit 13, wherein the stabilization control signals indicate whether the ambient status and/or the target brightness value are available to change or not.

The auto exposure control system 100 of the embodiment may include an exposure value control unit 14 that is configured to compute a desired exposure value by comparing the target brightness value with the weighted mean brightness value and generate an exposure command such as an integration time, an analog gain and a digital gain according to the desired exposure value. In one embodiment, the desired exposure value is generated according to a ratio or a difference between the target brightness value (generated from the target control unit 13) and the weighted mean brightness value (generated from the mean statistics unit 11). Accordingly, the integration time, the analog gain and the digital gain of the image sensor may be adjusted according to the desired exposure value newly generated from the exposure value control unit 14, such that the image array could possess a proper weighted mean brightness value being close enough to the target brightness value.

Figure 3A:
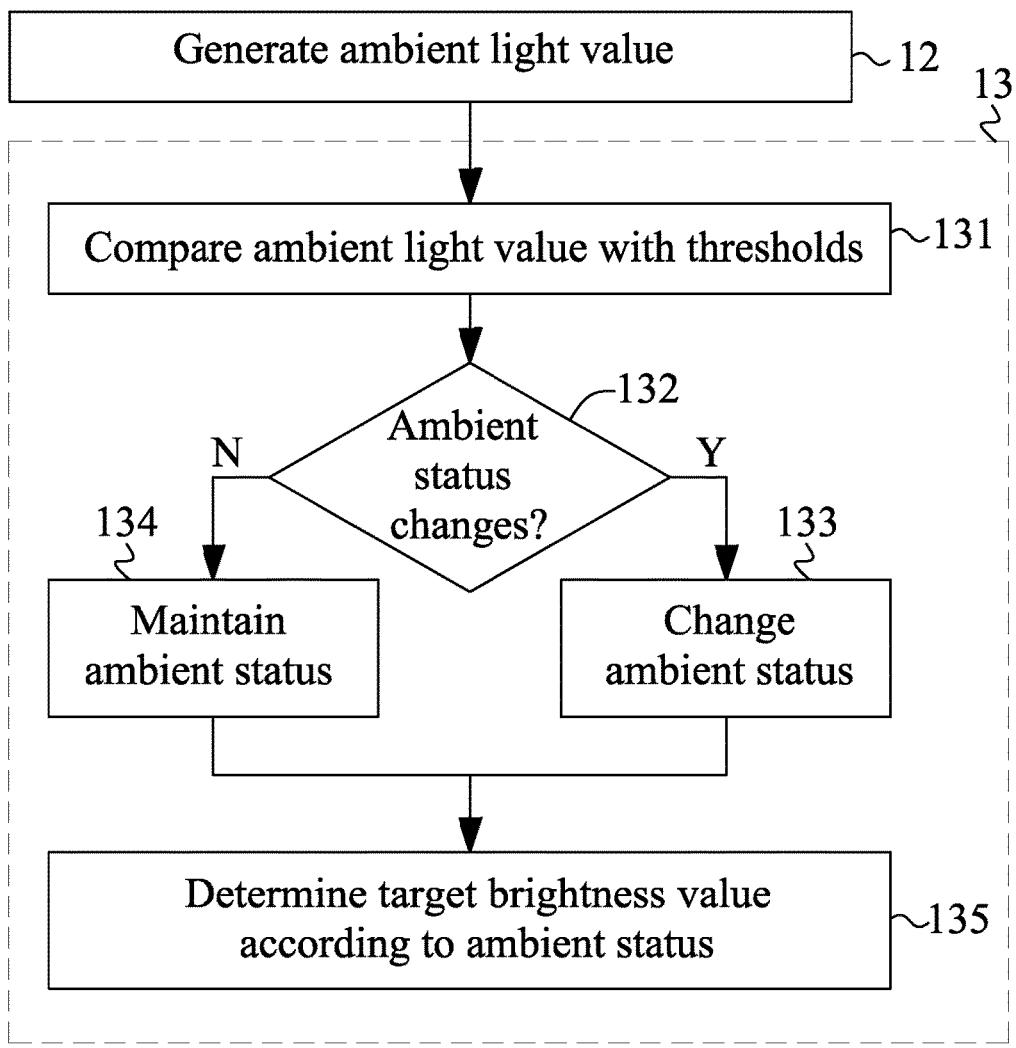
FIG. 3A shows a flow diagram illustrated of an auto exposure control method according to a first embodiment of the present invention.
Figure 3B:
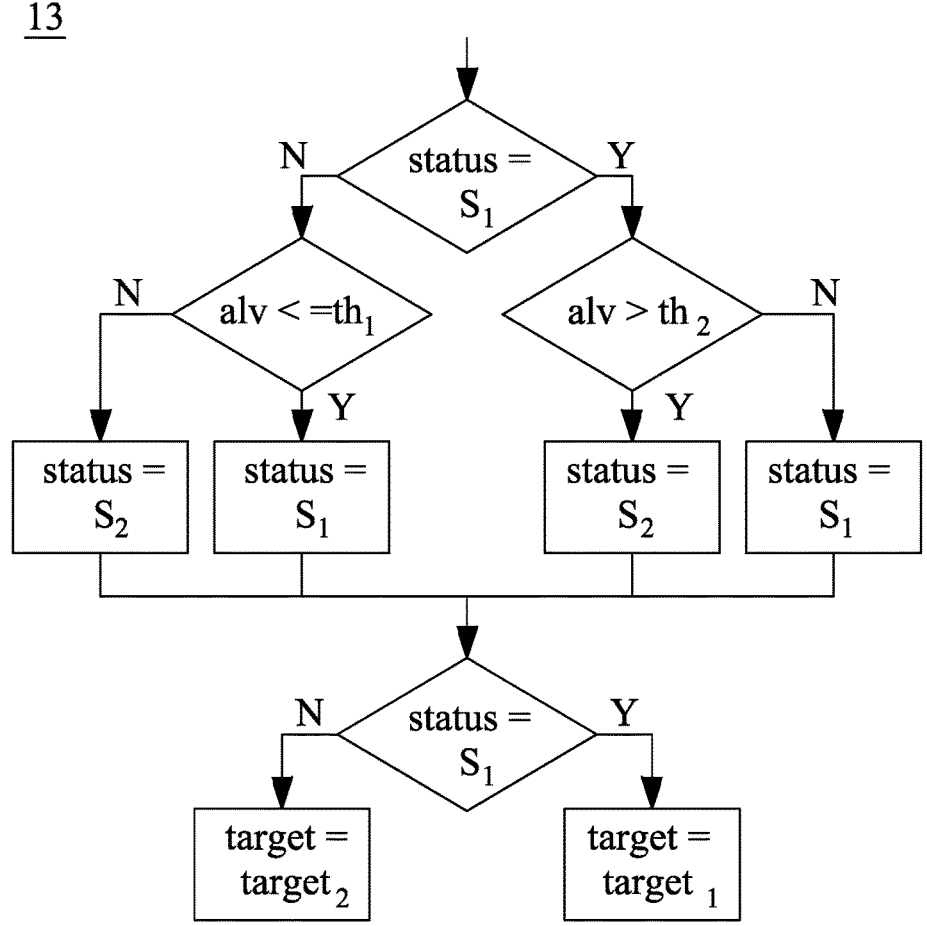
FIG. 3B shows a detailed flow diagram illustrated of step 13 of FIG. 3A.
Figure 4:
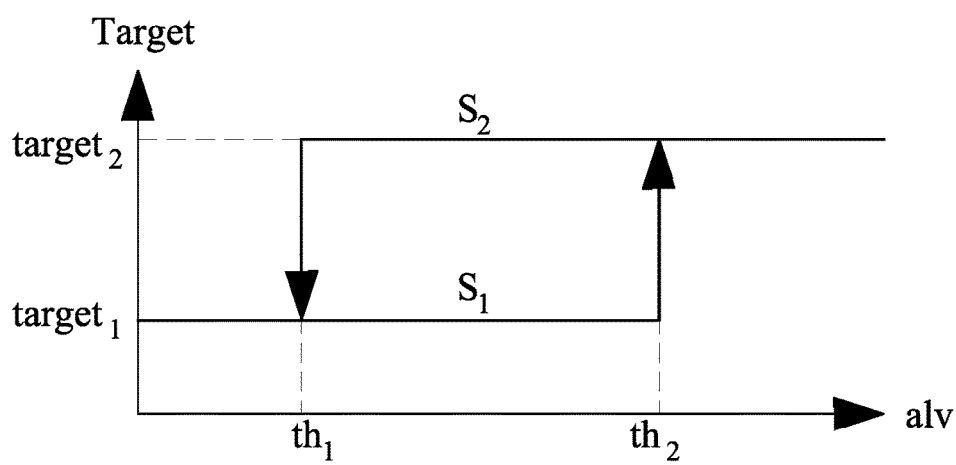
FIG. 4 shows ambient status with respect to the ambient light value according to the first embodiment.

The auto exposure control system 100 of the embodiment may further include an ambient light value generating unit 12 that is configured to generate an ambient light value, wherein the ambient light value is provided for the target control unit 13. The ambient light value may be determined by pixel intensity values, an integration time and a gain. In one embodiment, the ambient light value is generated by dividing an average of the pixel intensity values of the image array by the corresponding exposure value. The generated ambient light value may represent an average luminance value which includes both reflectance information and illuminance information for the surrounding of the image sensor FIG. 3A shows a flow diagram illustrated of an auto exposure control method according to a first embodiment of the present invention. Steps corresponding to the blocks depicted in FIG. 1 are denoted with the same numerals. In step 12, an ambient light value alv is generated. In step 131, the ambient light value is compared with thresholds in order to determine whether the ambient status should be changed (step 132). FIG. 4 shows the ambient status with respect to the ambient light value alv according to the first embodiment. In the embodiment, there are two statuses $S_1$ and $S_2$, and there are two thresholds $th_1$ and $th_2$ for determining the ambient status. The target control unit 13 compares the ambient light value alv with the thresholds $th_1$ and $th_2$ ($th_1 <= th_2$) in order to determine whether the ambient status should be changed. The ambient status is changed to status $S_2$ when $alv > th_2$ (step 133), the ambient status is changed to status $S_1$ when $alv <= th_1$ (step 133), and the ambient status is maintained when $th_1 < alv <= th_2$ (step 134). Next, in step 135, the target brightness value is determined according to the ambient status. That is, the target brightness value $target_2$ is used during $S_2$, and the target brightness value $target_1$ is used during $S_1$. FIG. 3B shows a detailed flow diagram illustrated of step 13 of FIG. 3A.

It is a usual occurrence that the ambient status may be changed too frequently such that the target brightness value may accordingly be changed too frequently too. To avoid such problem, a delay scheme (or function) may be adopted in the stabilization unit 15 by using a counter that increments a count number whenever ambient status information provided by the target control unit 13 indicates that the ambient status is going to change, that is, the ambient light value $alv > th_2$ during status $S_1$ or the ambient light value $alv <= th_1$ during status $S_2$. A status change control signal which verifies that the change of the ambient status is available does not generate until the count number exceeds a predetermined number, and the change of the ambient status does not happen until the target control unit 13 receives the status change control signal.

Figure 5A:
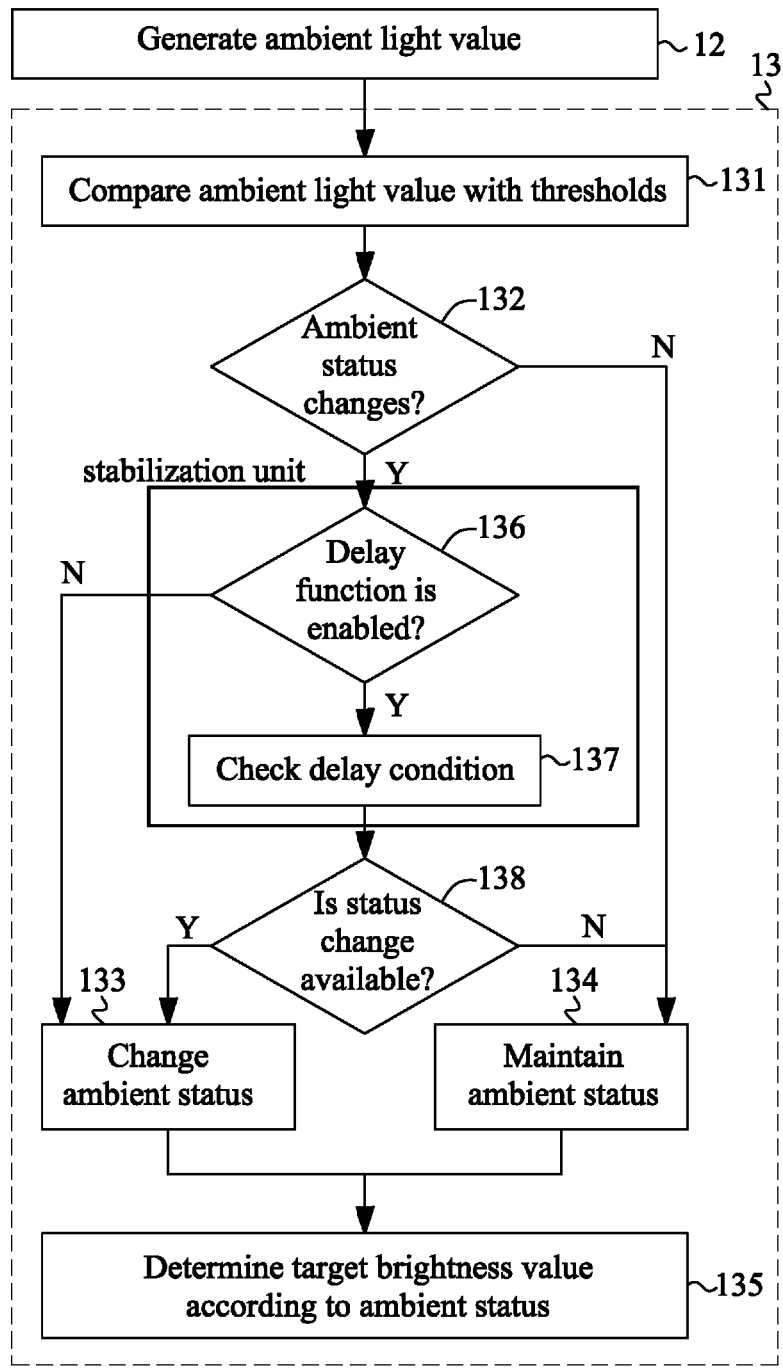
FIG. 5A shows a modified flow diagram illustrated of the auto exposure control method with delay function according to the first embodiment of the present invention.
Figure 5B:
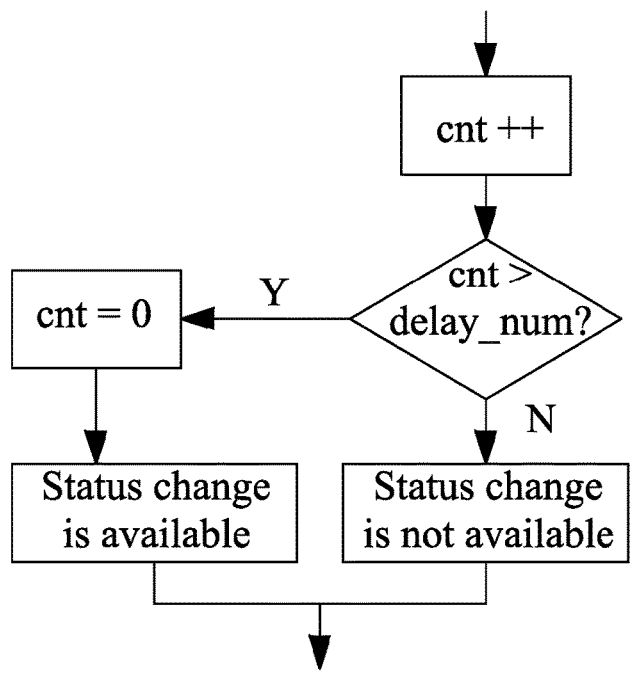
FIG. 5B shows a detailed flow diagram illustrated of step 137 of FIG. 5A.

FIG. 5A shows a modified flow diagram illustrated of the auto exposure control method with delay function according to the first embodiment of the present invention. If the delay function is enabled (step 136), the counter is used to check delay condition (step 137) in order to determine whether the ambient status change is available (step 138). FIG. 5B shows a detailed flow diagram illustrated of step 137 of FIG. 5A, where cnt is the count number, and delay_num is the predetermined number.

Figure 6A:
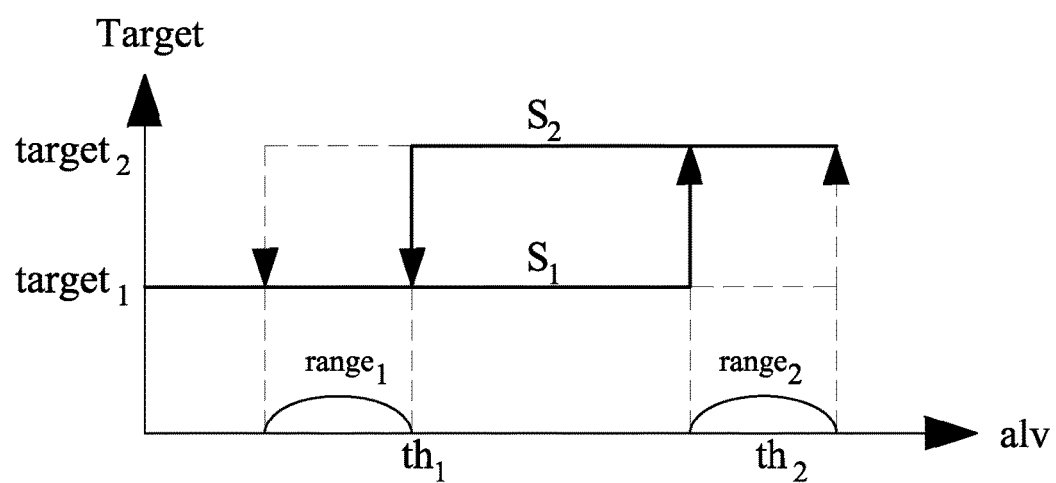
FIG. 6A shows ambient status with respect to the ambient light value with jump function according to the first embodiment.
Figure 6B:
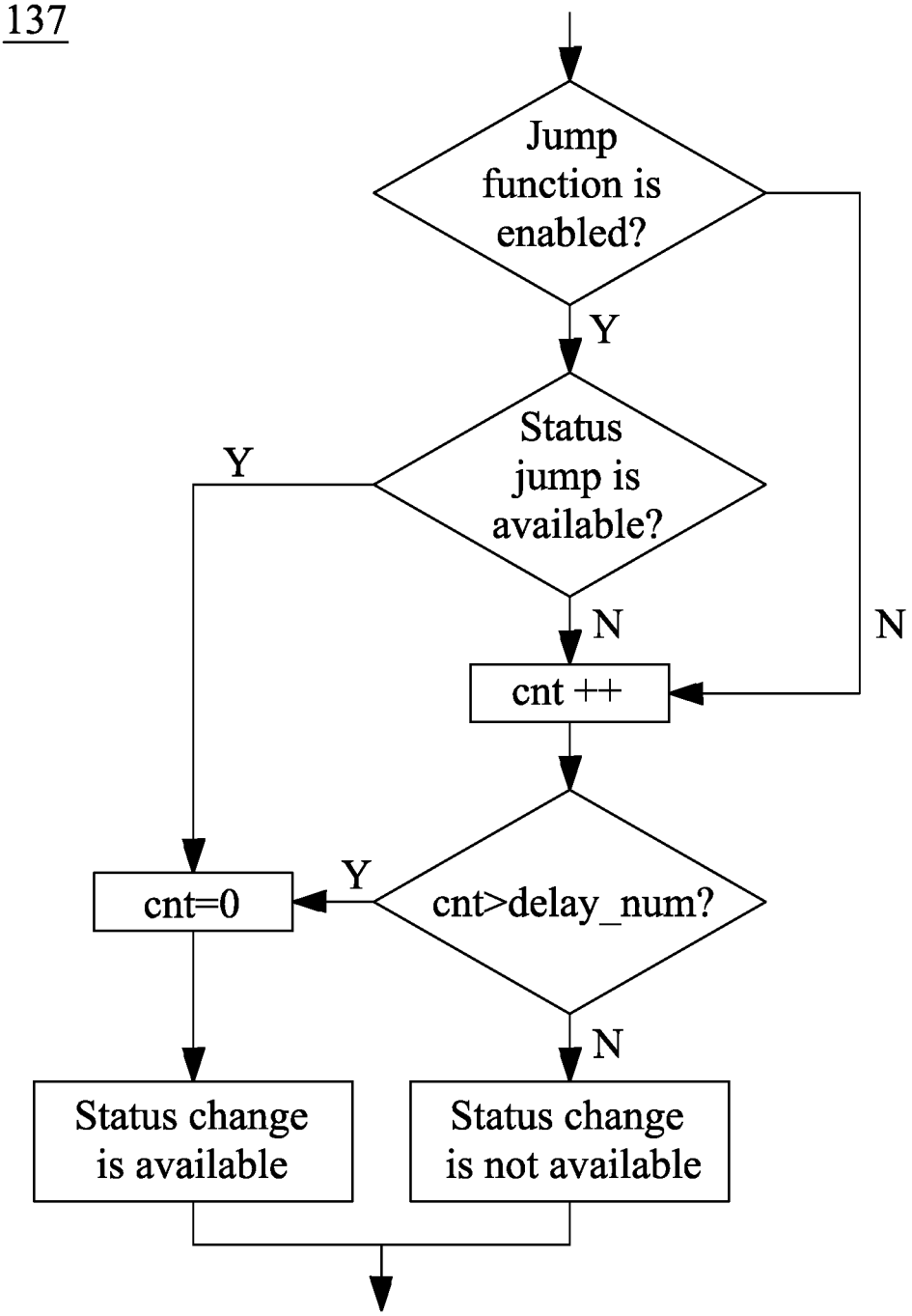
FIG. 6B shows a detailed flow diagram illustrated of step 137 of FIG. 5A with delay function and jump function according to the first embodiment of the present invention.

Once the delay function is enabled, frames of the predetermined number have to go through before the ambient status is changed. Sometimes when there is a large change in the ambient light value, we may want to change the ambient status immediately. To achieve such purpose, a jump scheme (or function) may be adopted in the stabilization unit 15. In the embodiment, as exemplified in FIG. 6A, the ambient status is allowed to change immediately to status $S_2$ when the ambient light value is higher than the by more than a predetermined range $range_2$ (i.e., $alv > th_2 + range_2$); and the ambient status is allowed to change immediately to status $S_1$ when the ambient light value is substantially lower than $th_1$ by more than a predetermined range $range_1$ (i.e., $alv <= th_1 - range_1$). It is appreciated that $range_1$ may be different from, or the same as, $range_2$. FIG. 6B shows a detailed flow diagram illustrated of step 137 of the auto exposure control method with delay function and jump function according to the first embodiment of the present invention.

Figure 7A:
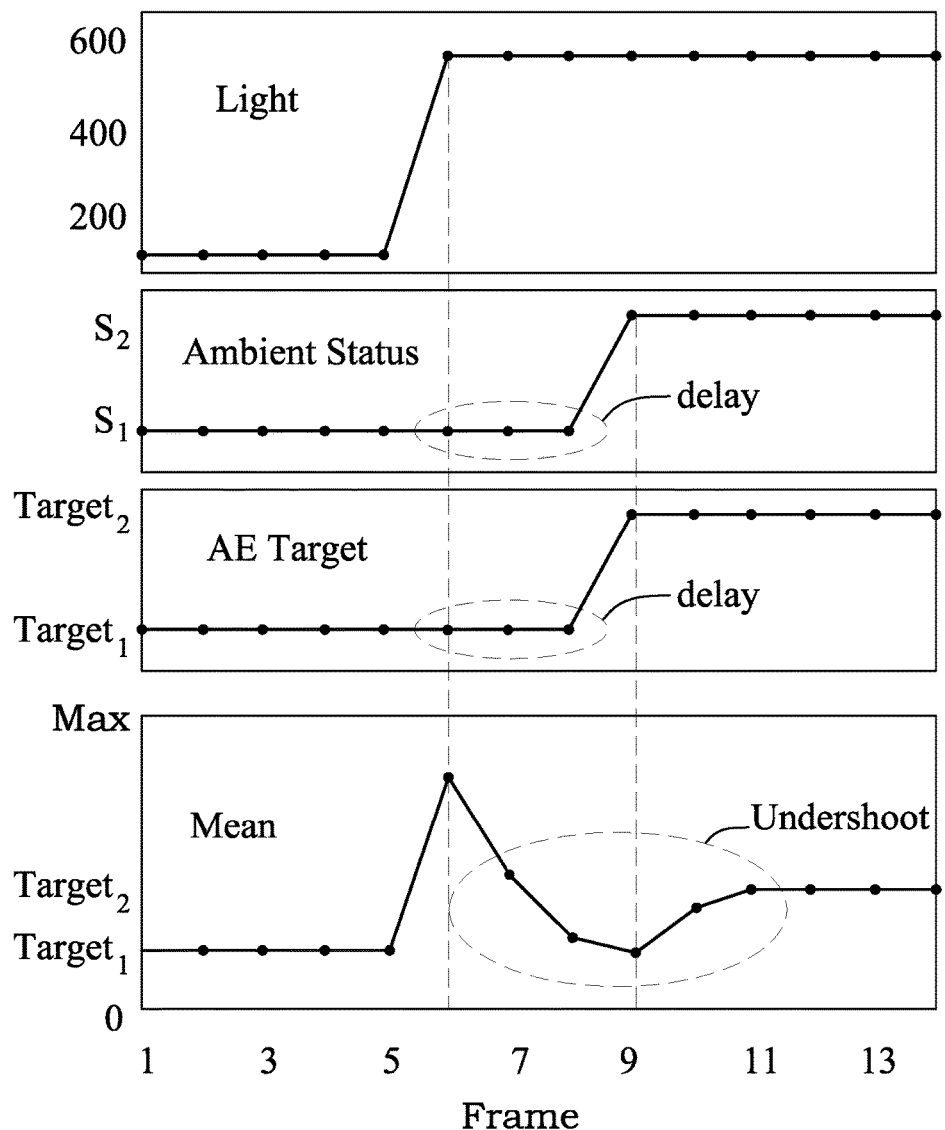
FIG. 7A shows a timing diagram exemplifying undershooting.
Figure 7B:
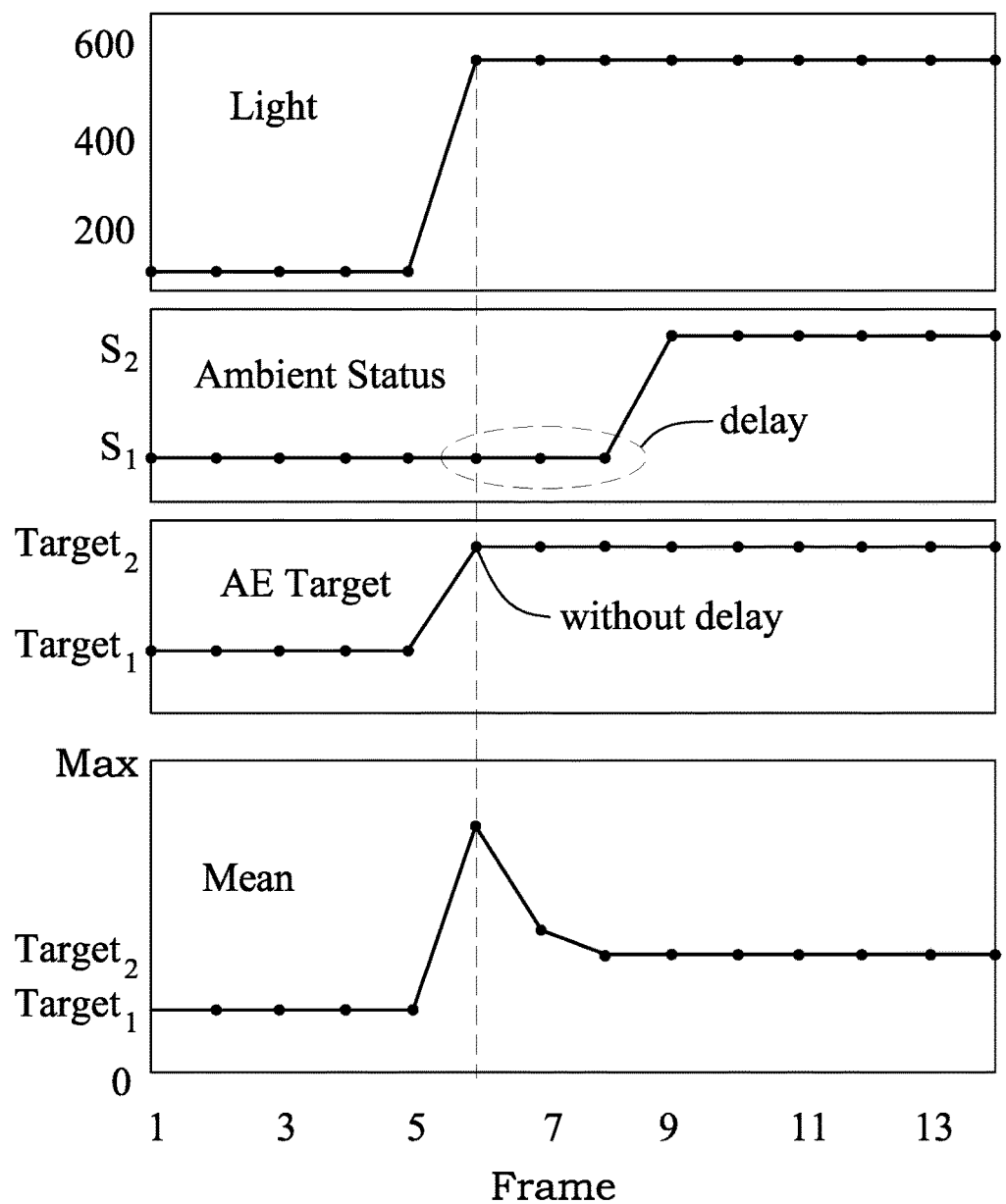
FIG. 7B shows a timing diagram when sneak function is adopted.
Figure 8:
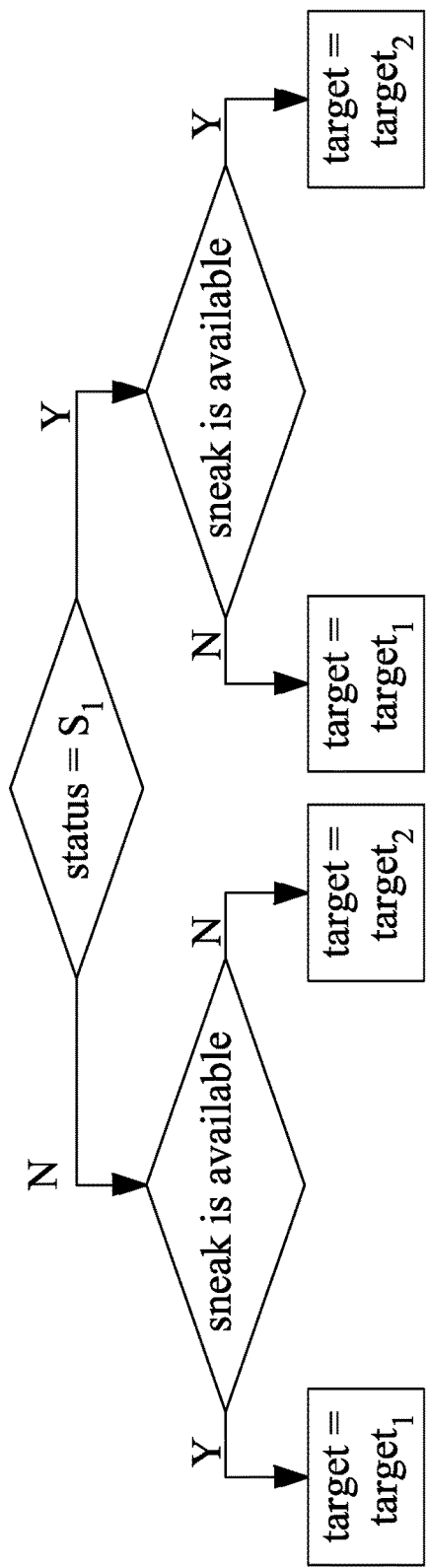
FIG. 8 shows a detailed flow diagram illustrated of step 135 of FIG. 5A with sneak function according to the first embodiment of the present invention.
Figure 9A:
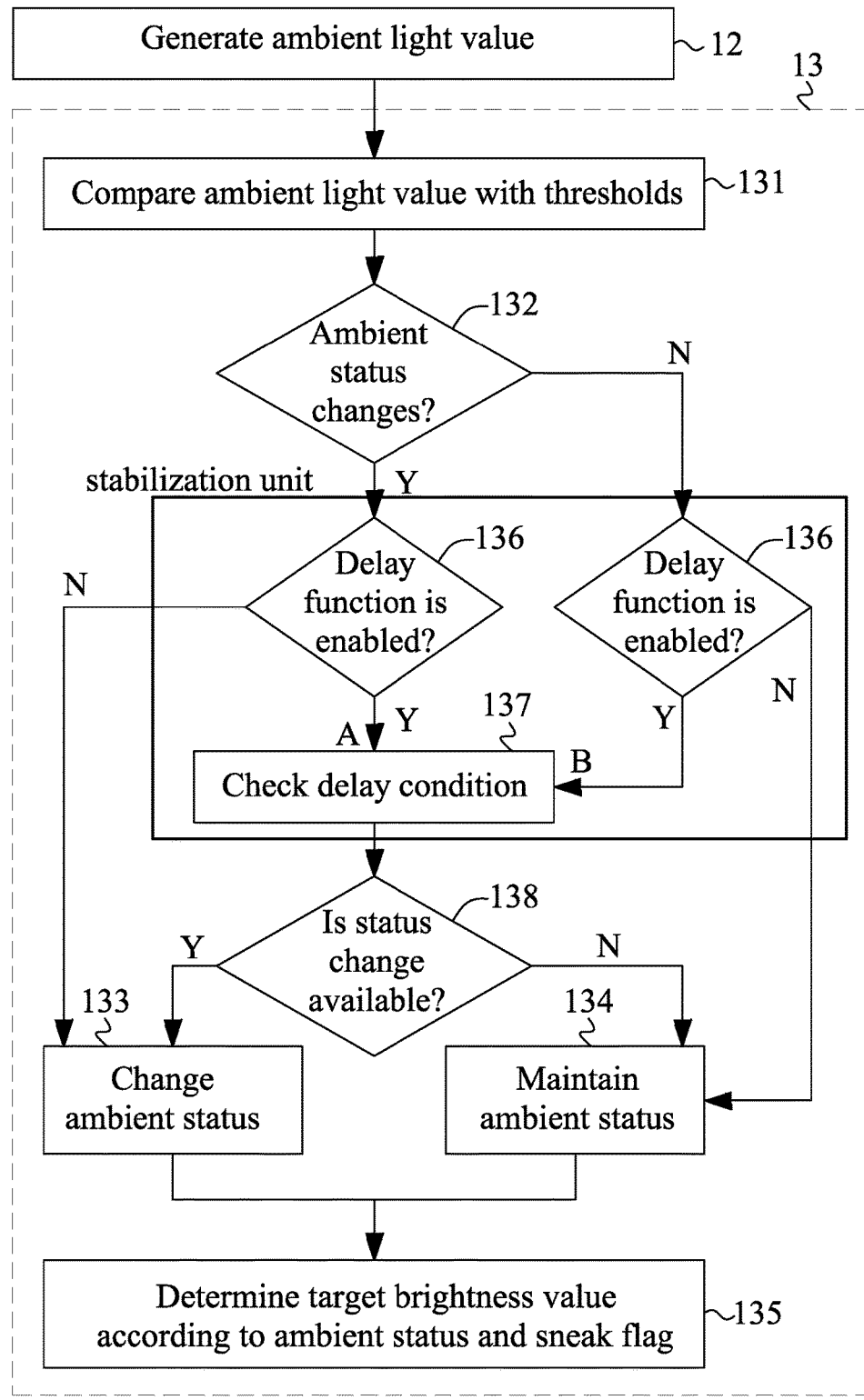
FIG. 9A shows a modified flow diagram illustrated of the auto exposure control method with delay function, jump function and sneak function according to the first embodiment of the present invention.
Figure 9B:
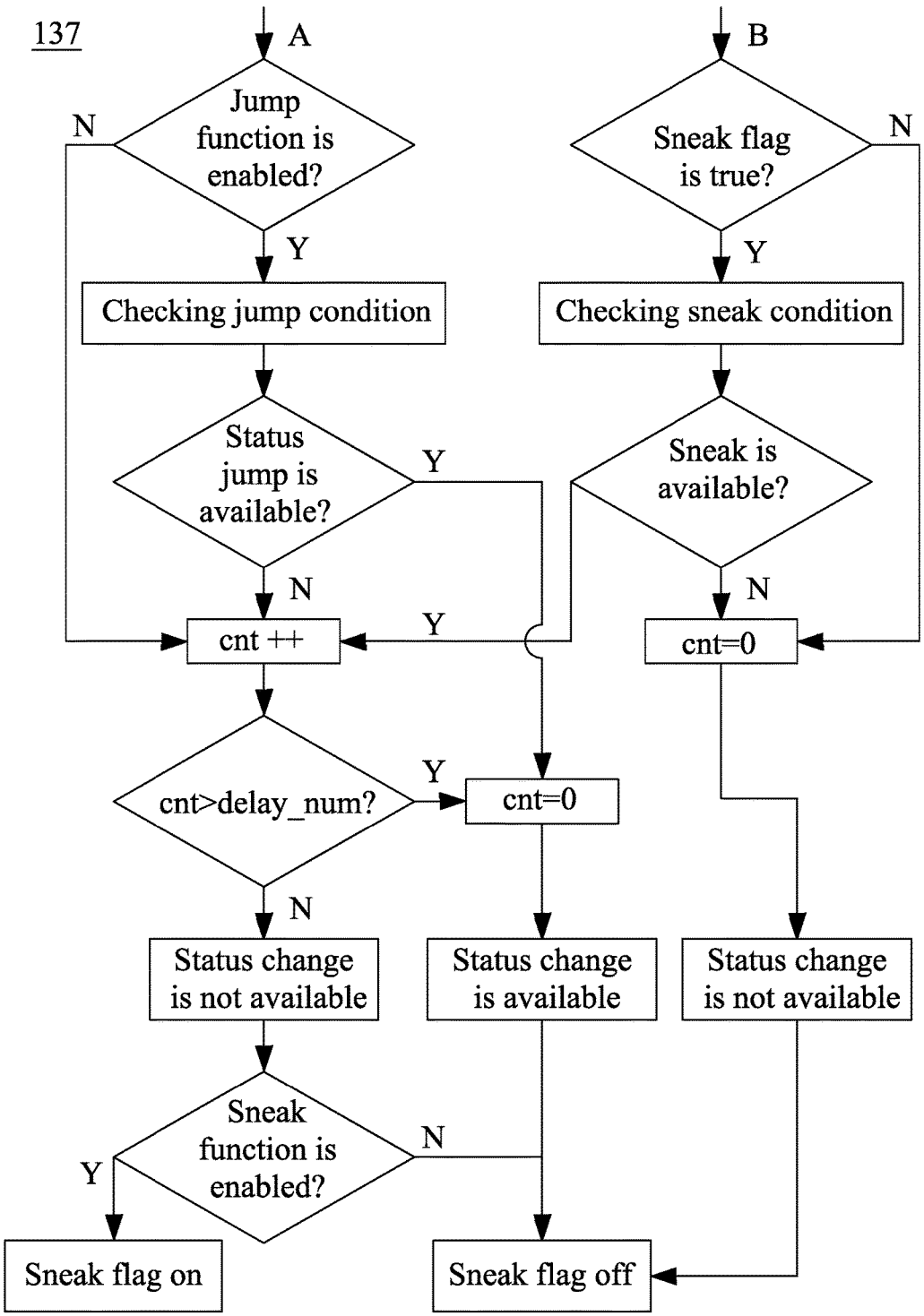
FIG. 9B shows a detailed flow diagram illustrated of step 137 of FIG. 9A.

As the change of the ambient status is delayed when the delay function is enabled, the adjustment of the target brightness value is also delayed, which may cause brightness overshooting or undershooting. FIG. 7A shows a timing diagram exemplifying undershooting. To avoid such problem, a sneak scheme (or function) may be adopted in the stabilization unit 15 to adjust the target brightness value before the change of the ambient status. FIG. 8 shows a detailed flow diagram illustrated of step 135 of FIG. 5A with sneak function. In the embodiment, when the ambient light value alv>$th_2$ during status $S_1$, the ambient status would be maintained in status $S_1$ for a predetermined number of frames when the delay function is enabled. If the sneak function is enabled during the delay, a sneak flag is enabled. Once the sneak flag is enabled, a sneak control signal which verifies that the pre-change of the target brightness value is available is sent to the target control unit 13 so that the target brightness value $target_2$ for status $S_2$ would be selected before the ambient status is changed to status $S_2$. The sneak flag will be kept enabled until the ambient status is changed to status $S_2$ or the sneak condition (alv>$th_2$) is invalid. Similarly, when the ambient light value alv<=$th_1$ during status $S_2$, the ambient status would be maintained in status $S_2$ for a predetermined number of frames when the delay function is enabled. If the sneak function is enabled during the delay, a sneak flag is enabled. Once the sneak flag is enabled, a sneak control signal which verifies that the pre-change of the target brightness value is available is sent to the target control unit 13 so that the target brightness value $target_1$ for status $S_1$ would be selected before the ambient status is changed to status $S_1$. The sneak flag will be kept enabled until the ambient status is changed to status $S_1$ or the sneak condition (alv<=$th_1$) is invalid. FIG. 7B shows a timing diagram when sneak function is adopted. FIG. 9A shows a modified flow diagram illustrated of the auto exposure control method with delay function, jump function and sneak function according to the first embodiment of the present invention, and FIG. 9B shows a detailed flow diagram illustrated of step 137 of FIG. 9A.

Figure 10A:
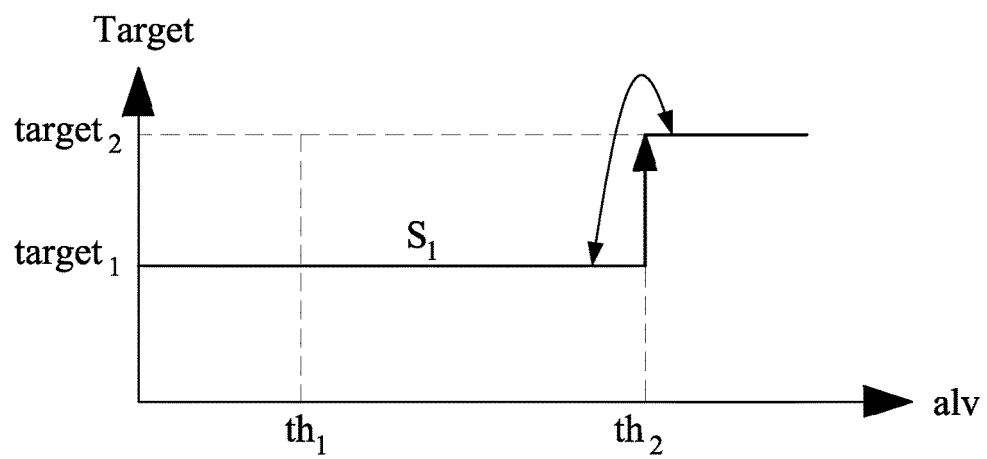
FIG. 10A and FIG. 10B show the change of the target brightness value with respect to the ambient light value with sneak function.
Figure 10B:
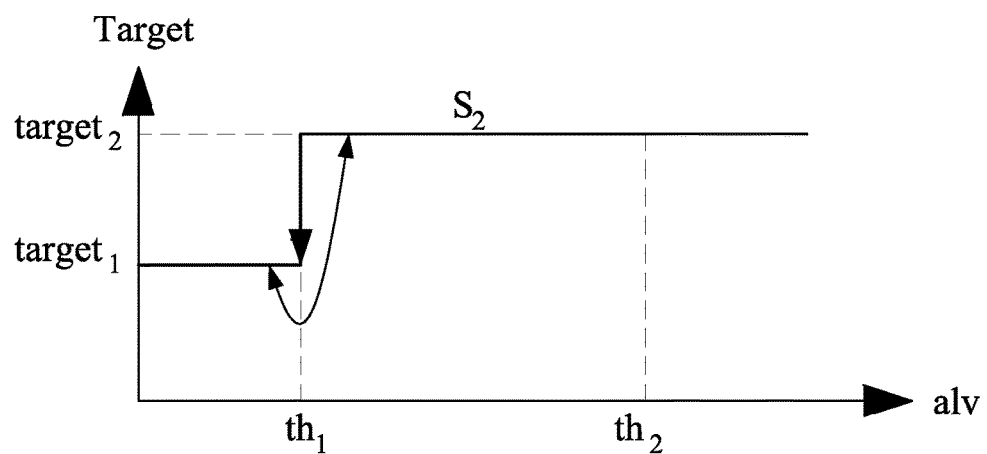
Figure 11A:
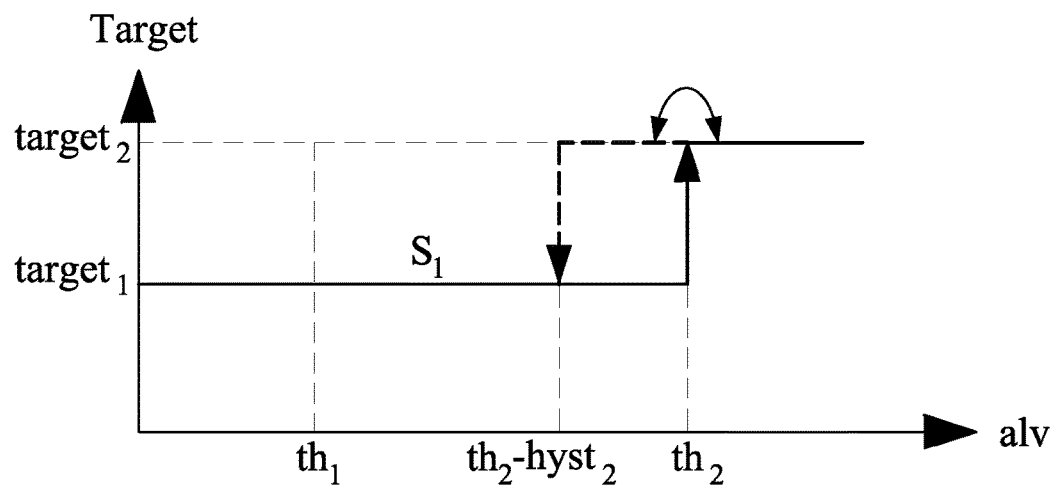
FIG. 11A and FIG. 11B show the change of the target brightness value with respect to the ambient light value with hysteresis values for the sneak function.
Figure 11B:
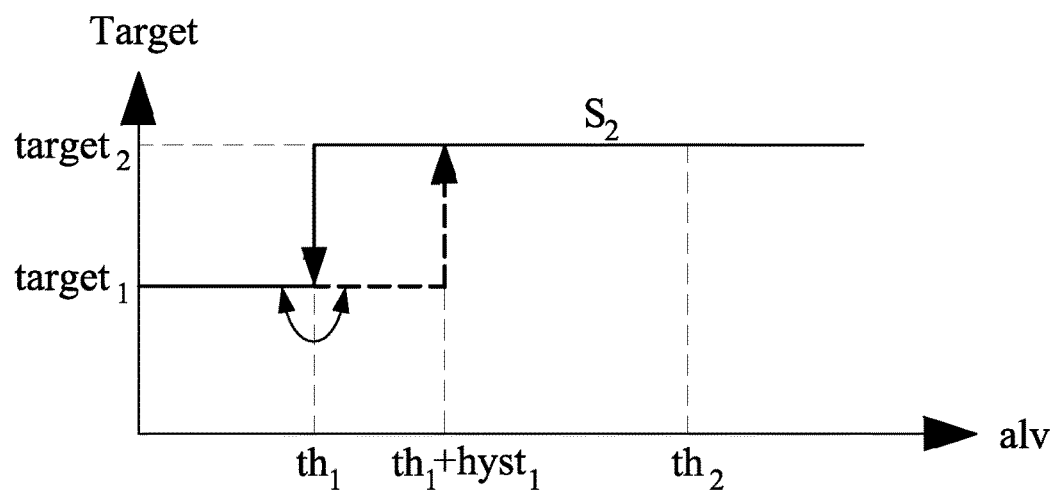

FIG. 10A and FIG. 10B show a target brightness value is changed with respect to the ambient light value alv with sneak function. If the ambient light value alv varies between the range alv>$th_2$ to alv<=$th_2$ during status $S_1$ (FIG. 10A), or the ambient light value alv varies between the range alv<=$th_1$ to alv>$th_1$ during status $S_2$ (FIG. 10B), the target brightness value will directly be changed between the target brightness values $target_1$ and $target_2$, therefore leading to a brightness oscillation. To avoid such problem, a hysteresis value may be used as shown in FIG. 11A and FIG. 11B. Once the sneak flag is enabled during status $S_2$, the sneak flag would be kept enabled until alv>$th_1$+$hyst_1$ (where $hyst_1$ is a hysteresis value) or the ambient status is changed. Similarly, once the sneak flag is enabled during status $S_1$, the sneak flag would be kept enabled until alv<=$th_2$-$hyst_2$ (where $hyst_2$ is a hysteresis value, which may be different from or the same as $hyst_1$) or the ambient status is changed.

Figure 12:
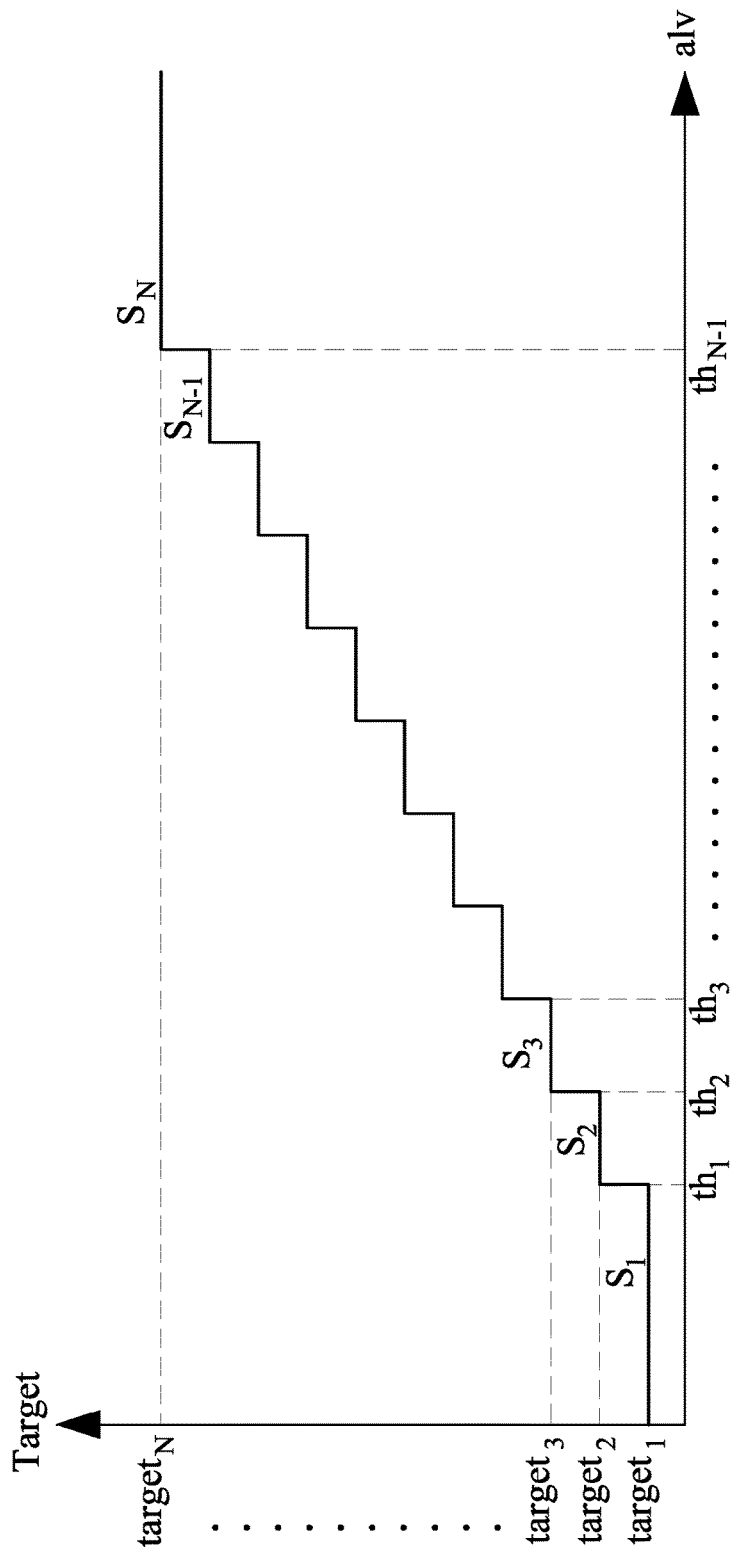
FIG. 12 shows ambient status with respect to the ambient light value according to the second embodiment of the present invention.

FIG. 12 shows ambient status with respect to the ambient light value alv according to the second embodiment of the present invention. In the embodiment, there are N (N>=2) statuses $S_1$ to $S_N$, and there are N−1 thresholds $th_1$ to $th_{N-1}$ (where $th_1$<$th_2$<. . . <$th_{N-1}$) for determining the ambient status. The ambient status is set as $S_x$ when the ambient light value alv<=$th_x$ (0<x<N); and the ambient status is set as $S_N$ when the ambient light value alv>$th_{N-1}$. In the embodiment, each of the statuses $S_1$ to $S_N$ has a corresponding target brightness value $target_1$ to $target_N$, respectively. Once the ambient status is determined, the target brightness value corresponding to the status ($S_1$, $S_2$ . . . or $S_N$) is set as the determined target brightness value.

Figure 13:
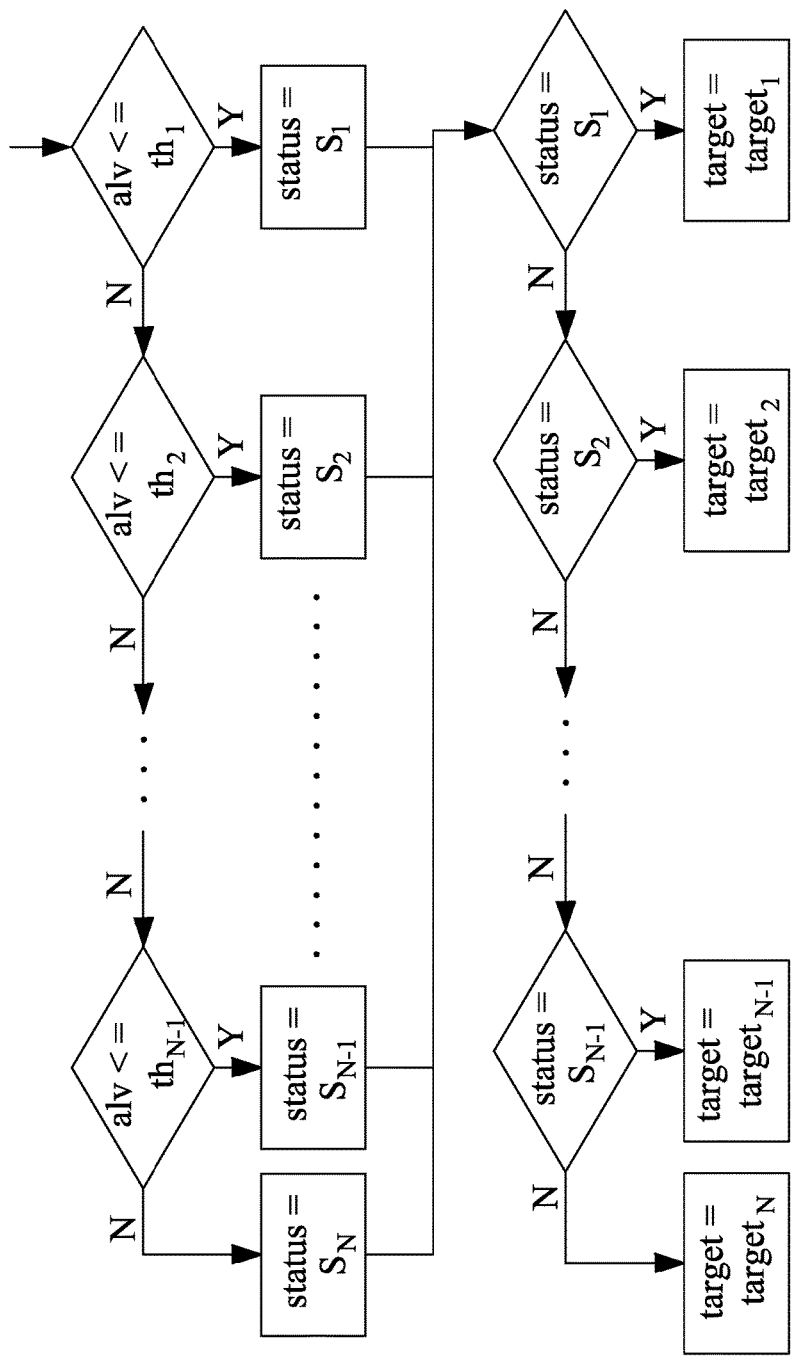
FIG. 13 shows a detailed flow diagram illustrated of step 13 of FIG. 3A according to the second embodiment of the present invention.

The flow diagram illustrated of the auto exposure control method as shown in FIG. 3A may apply to the second embodiment. FIG. 13 shows a detailed flow diagram illustrated of step 13 for the second embodiment.

Figure 14:
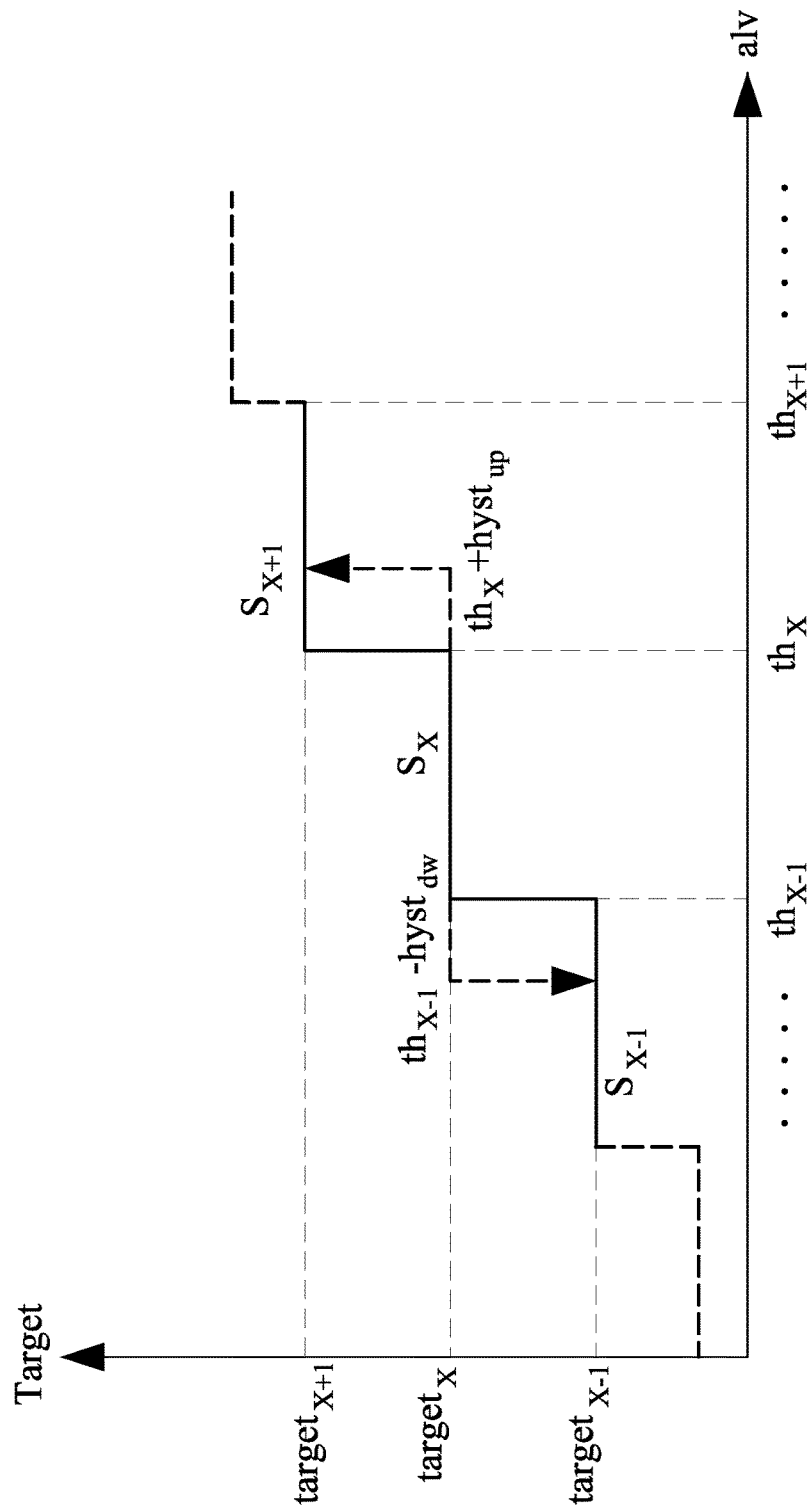
FIG. 14 shows ambient status with respect to the ambient light value with the hysteresis function according to the second embodiment of the present invention.

Since the target brightness value may be changed according to the ambient status which is determined by the ambient light value and the thresholds, this may cause brightness oscillation due to the fluctuation of the ambient light value. Therefore, a hysteresis function may be added to enhance the stability. FIG. 14 shows ambient status with respect to the ambient light value alv with the hysteresis function. The hysteresis function of the embodiment may include the following operations. Assume the current ambient status is $S_x$, the ambient status and the target brightness value will not be changed until the following conditions are true:

$$alv>th_x+hyst_{up}, \text{ where } hyst_{up}>=0; \text{ or/and}$$

$$alv<=th_{x-1}-hyst_{dw}, \text{ where } 0<=hyst_{dw}<=th_{x-1}.$$

It is appreciated that $hyst_{dw}$ may be different from, or the same as, $hyst_{up}$.

The delay function adopted in the first embodiment may be adopted in the second embodiment as well. A counter is used to control the delay function. Specifically, the counter increments a count number whenever ambient status information provided by the target control unit 13 indicates that the ambient status is going to change. Once the count number exceeds a predetermined number, the counter is reset and a status change control signal is sent to the target control unit 13 to verify the change of the ambient status.

The jump function adopted in the first embodiment may be adopted in the second embodiment as well. Specifically, the ambient status is allowed to change immediately when the change of the ambient light value exceeds a predetermined range. Assume the current ambient status is $S_x$ and there are two predetermined range $range_{up}$ and $range_{dw}$. The ambient status is changed immediately to $S_{x+k}$ when $th_{x+k-1}$<alv<=$th_{x+k}$ and alv>$th_x$+$range_{up}$. The ambient status is allowed to change immediately to $S_{x-j}$ when $th_{x-j-1}$<alv<=$th_{x-j}$ and alv<=$th_x$−$range_{dw}$. It is appreciated that $range_{up}$ may be different from, or the same as $range_{dw}$.

The sneak function adopted in the first embodiment may be adopted in the second embodiment as well. Specifically, if the current ambient status is $S_x$ and is going to change to $S_y$ (i.e., $th_{y-1}$<alv<=$th_y$), the status change control signal would maintain the ambient status in $S_x$ for a predetermined number of frames when the delay function is enabled. If the sneak function is also enabled, a sneak flag is enabled. Once the sneak flag is enabled, a sneak control signal which verifies that the pre-change of the target brightness value is available is sent to the target control unit 13 so that the target brightness value $target_y$ for status $S_y$ would be selected before the ambient status is changed to $S_y$. The sneak flag will be kept enabled until the ambient status is changed or the sneak condition is invalid.

The hysteresis value used in the first embodiment to avoid the oscillation problem during sneaking may be adopted in the second embodiment as well. Once the sneak flag is enabled, the target brightness value would be $target_y$, which will not be changed until alv>$th_y$+$hyst_{sneak\_up}$ or alv<=$th_y$−$hyst_{sneak\_dw}$. It is appreciated that $hyst_{sneak\_up}$ may be different from, or the same as $hyst_{sneak\_dw}$.

What is claimed is:

1. An auto exposure control system, comprising:
   a mean statistics unit that generates a weighted mean brightness value for an image array;
   a target control unit that determines a target brightness value according to an ambient status that is determined in accordance with an ambient light value;
   a stabilization unit that generates stabilization control signals for the target control unit according to the ambient light value and ambient status information provided by the target control unit; and
   an exposure value control unit that computes a desired exposure value by comparing the target brightness value with the weighted mean brightness value and determines an exposure command according to the desired exposure value.

2. The system of claim 1, wherein the target control unit comprises:
   an ambient status determining unit that determines the ambient status from a plurality of statuses according to the ambient light value; and
   a target determining unit that determines the target brightness value according to the ambient status.

3. The system of claim 1, wherein the ambient light value is determined by pixel intensity values, an integration time and a gain.

4. The system of claim 3, further comprising an ambient light value generating unit that generates the ambient light value by the pixel intensity values, the integration time and the gain.

5. The system of claim 1, wherein the stabilization unit comprising a counter that increments a count number whenever the ambient status information indicates that the ambient status is determined to be changed, wherein the ambient status delays changing until the count number exceeds a predetermined number.

6. The system of claim 5, when the ambient status delays changing, wherein the ambient status is changed immediately when the ambient light value is changed by more than a predetermined range.

7. The system of claim 6, when the ambient status delays changing, a target brightness value corresponding to a specific ambient status $S_y$ is sneakingly selected before the ambient status is changed to said specific ambient status $S_y$.

8. The system of claim 7, before the ambient status is changed to said specific ambient status $S_y$, the target brightness value corresponding to said specific ambient status $S_y$ is maintained when the ambient light value is within $th_y + hyst_{sneak\_up}$ and $th_{y-1} - hyst_{sneak\_dw}$, where $th_y$ is an upper threshold for determining said specific ambient status $S_y$, $th_{y-1}$ is a lower threshold for determining said specific ambient status $S_y$, and $hyst_{sneak\_up}$ and $hyst_{sneak\_dw}$ are hysteresis values.

9. The system of claim 1, wherein the ambient status is determined according to N statuses (N>=2) and N-1 thresholds, wherein the ambient status is set as X-th status (0<X<N) when the ambient light value is less than or equal to X-th threshold, and the ambient status is set as N-th status when the ambient light value is greater than N-1-th threshold.

10. The system of claim 9, wherein a current ambient status X and a corresponding target brightness value are not changed until a corresponding ambient light value is greater than the X-th threshold with a first hysteresis amount, and/or the corresponding ambient light value is less than or equal to the X-1-th threshold with a second hysteresis amount.

11. An auto exposure control method, comprising:
   generating a weighted mean brightness value for an image array;
   determining a target brightness value according to an ambient status that is determined in accordance with an ambient light value;
   generating stabilization control signals according to the ambient light value and ambient status information; and
   computing a desired exposure value by comparing the target brightness value with the weighted mean brightness value, and determining an exposure command according to the desired exposure value.

12. The method of claim 11, wherein the step of determining the target brightness value comprises:
   determining the ambient status from a plurality of statuses according to the ambient light value; and
   determining the target brightness value according to the ambient status.

13. The method of claim 11, wherein the ambient light value is determined by pixel intensity values, an integration time and a gain.

14. The method of claim 11, further comprising a step of incrementing a count number whenever the ambient status information indicates that the ambient status is determined to be changed, wherein the ambient status delays changing until the count number exceeds a predetermined number.

15. The method of claim 14, when the ambient status delays changing, wherein the ambient status is changed immediately when the ambient light value is changed by more than a predetermined range.

16. The method of claim 15, when the ambient status delays changing, a target brightness value corresponding to a specific ambient status $S_y$ is sneakingly selected before the ambient status is changed to said specific ambient status $S_y$.

17. The method of claim 16, before the ambient status is changed to said specific status $S_y$, the target brightness value corresponding to said specific ambient status $S_y$ is maintained when the ambient light value is within $th_y + hyst_{sneak\_up}$ and $th_{y-1} - hyst_{sneak\_dw}$, where $th_y$ is an upper threshold for determining said specific ambient status $S_y$, $th_{y-1}$ is a lower threshold for determining said specific ambient status $S_y$, and $hyst_{sneak\_up}$ and $hyst_{sneak\_dw}$ are hysteresis values.

18. The method of claim 11, wherein the ambient status is determined according to N statuses (N>=2) and N-1 thresholds, wherein the ambient status is set as X-th status (0<X<N) when the ambient light value is less than or equal to X-th threshold, and the ambient status is set as N-th status when the ambient light value is greater than N-1-th threshold.

19. The method of claim 18, wherein a current ambient status X and a corresponding target brightness value are not changed until a corresponding ambient light value is greater than the X-th threshold with a first hysteresis amount, and/or the corresponding ambient light value is less than or equal to the X-1-th threshold with a second hysteresis amount.

* * * * *